United States Patent [19]
Smithback

[11] Patent Number: 5,913,750
[45] Date of Patent: Jun. 22, 1999

[54] FELINE EXERCISE AND ENTERTAINMENT CENTER

[76] Inventor: David E. Smithback, W6598 Cty. A, Pickerel, Wis. 54465

[21] Appl. No.: 08/975,482

[22] Filed: Nov. 20, 1997

[51] Int. Cl.$^6$ ..................................................... A63B 22/02
[52] U.S. Cl. .............................................. 482/54; 482/35
[58] Field of Search ..................... 119/700, 847, 119/703, 846, 845, 702, 843; 482/37, 54, 35

[56] References Cited

U.S. PATENT DOCUMENTS

| | | | |
|---|---|---|---|
| D. 333,887 | 3/1993 | Dowler | D30/160 |
| D. 334,254 | 3/1993 | Mitchell | D30/160 |
| D. 350,421 | 9/1994 | Brubaker | D30/160 |
| 1,821,826 | 9/1931 | Ballew . | |
| 3,110,388 | 11/1963 | Elliott et al. | 119/845 |
| 3,702,600 | 11/1972 | Bright et al. | 119/846 |
| 3,791,348 | 2/1974 | Marnett | 119/700 |
| 4,095,561 | 6/1978 | Ruetenik | 119/700 |
| 5,002,012 | 3/1991 | Pierrot | 119/28.5 |
| 5,114,390 | 5/1992 | Tribelhorn | 119/700 |
| 5,328,422 | 7/1994 | Nichols | 482/37 |
| 5,496,232 | 3/1996 | Morris et al. | 482/35 |
| 5,577,465 | 11/1996 | Cook | 119/498 |

FOREIGN PATENT DOCUMENTS

| | | | |
|---|---|---|---|
| 0380005 | 8/1940 | Italy | 482/54 |
| 8504073 | 9/1985 | WIPO | 119/700 |

*Primary Examiner*—Jerome W. Donnelly
*Attorney, Agent, or Firm*—Lathrop & Clark

[57] ABSTRACT

A regulated and effective means of exercising cats, which also serves as a cat perch and central cat feeding and hygiene station has a frame constructed of conventional dimensioned timber which supports a horizontal perch in cantilever fashion. An inclined treadmill with a closed loop belt encircling a plurality of rotatable rollers extends between a support surface and the perch. The cat makes his way to the perch by climbing the treadmill, which may be set at varying inclinations to suit the cat's weight and strength to obtain the desired treadmill time for a particular perch entry. The treadmill and the perch are covered by bent sheets of plastic, which confine the cat and require the cat to traverse the treadmill rather than jumping to the perch. The perch may be fitted with a pivotable door to temporarily retain the pet within the perch enclosure for limited times.

19 Claims, 2 Drawing Sheets

FELINE EXERCISE AND ENTERTAINMENT CENTER

FIELD OF THE INVENTION

The present invention relates to apparatus for promoting the health of animal pets in general, and to devices which contribute to the well being of cats in particular.

BACKGROUND OF THE INVENTION

Regular exercise has been recognized as an important component of general health for humans. Exercise can contribute to alertness, combat obesity, and lead to improved outlook and mood. For these same reasons, moderate exercise is beneficial to pets. In the wild, cats spend much of their time tracking, stalking, and subduing their prey. All the requirements of life: securing and maintaining a den, rearing and educating kittens, and protecting life and family, are active demanding endeavors for the feline in its natural state.

The domesticated cat, on the other hand, has all the necessities of life provided by its owner. Prepared food is served on a dish. A warm place to sleep is readily available, and, for many cats owned by city dwellers, no kittens need by cared for. In the country and less populated areas, cats are occasionally released and allowed to roam outdoors for extending periods of time to seek their exercise. Yet even in localities where untethered cat roaming is not a violation of ordinance, it has a number of drawbacks. First, small mammals and automobiles are an unhappy combination, and feline mortality in urban areas from automobile collisions is a significant concern. Secondly, cats who spend a good deal of time outdoors are prone to insect infestation, disease, and dangerous quarrels with dogs, racoons, or other cats. For all these reasons, many modern cats live their lives contentedly indoors, with all their wants satisfied by caring owners.

Yet an entirely sedentary life can be detrimental to a cat's health and mood. Moreover, cats are naturally curious and inquisitive. If not provided with energetic activities, a cat may seek out its own diversions, causing unwelcome disturbances within the household. There exists a need therefore, for an economical device which can provide healthful exercise to cats within a limited floor space.

SUMMARY OF THE INVENTION

The feline exercise device of this invention provides a regulated and effective means of exercising cats, while at the same time serving as a cat perch and central cat feeding and hygiene station. The device has a sturdy elevated perch which is covered and enclosable, and which is reached by an inclined covered treadmill. The cat makes his way to the perch by climbing the treadmill, which may be set at varying inclinations to suit the cat's weight and strength to obtain the desired treadmill time for a particular perch entry. The treadmill and perch are supported by a frame constructed of dimensioned timber, which may be provided in kit form to the consumer for convenient assembly.

It is an object of the present invention to provide a feline exercise device which may be employed by a cat with minimal training.

It is another object of the present invention to provide a feline exercise device combined, in space-saving fashion, with a feline perch and feeding station.

It is another object of the present invention to provide a feline exercise device which is conveniently adjusted to accommodate cats of various body weights and degrees of liveliness.

Further objects, features and advantages of the invention will be apparent from the following detailed description when taken in conjunction with the accompanying drawings.

DESCRIPTION OF THE PREFERRED EMBODIMENT

Figure 1:
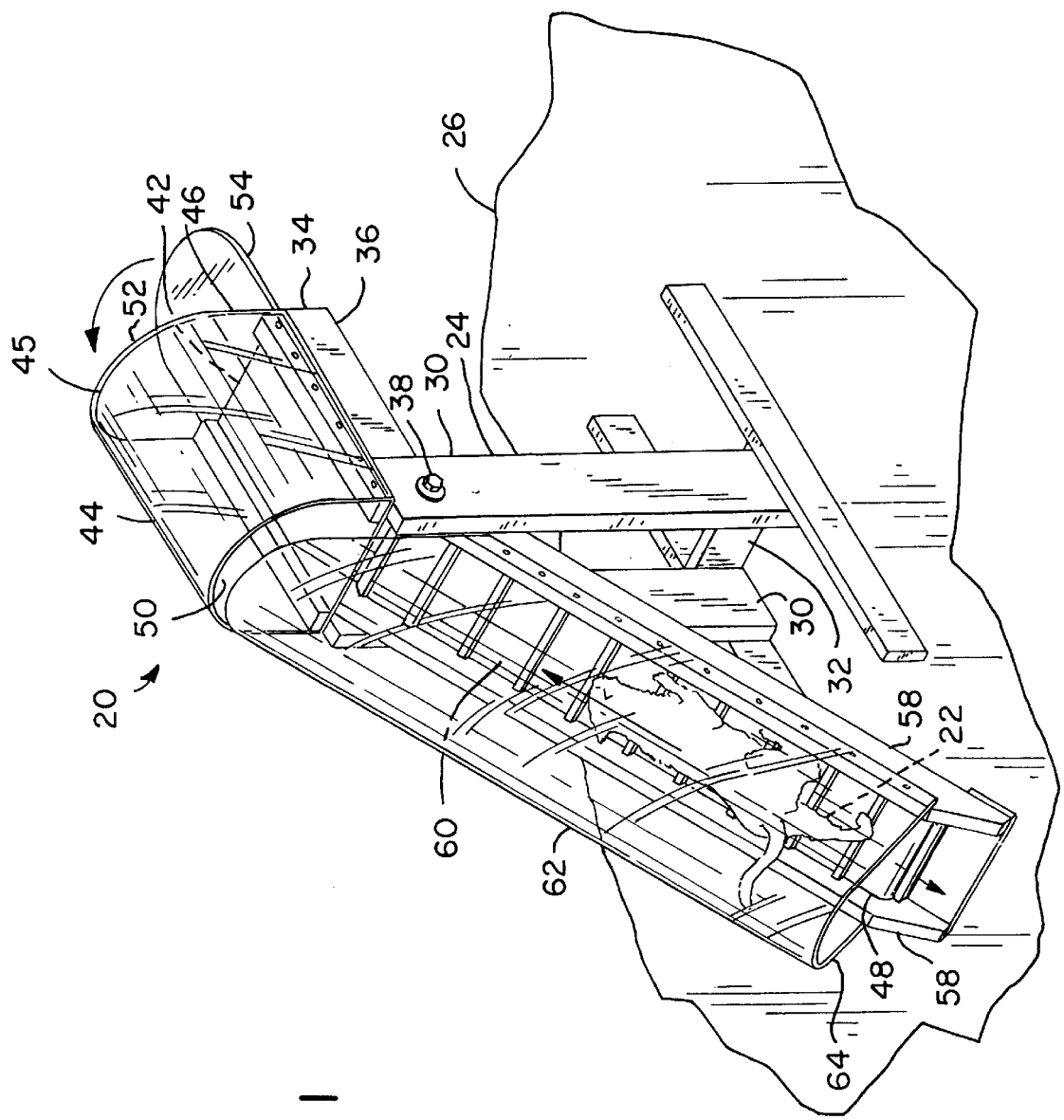
FIG. 1 is an isometric view of the feline exercise device of the present invention.
Figure 2:
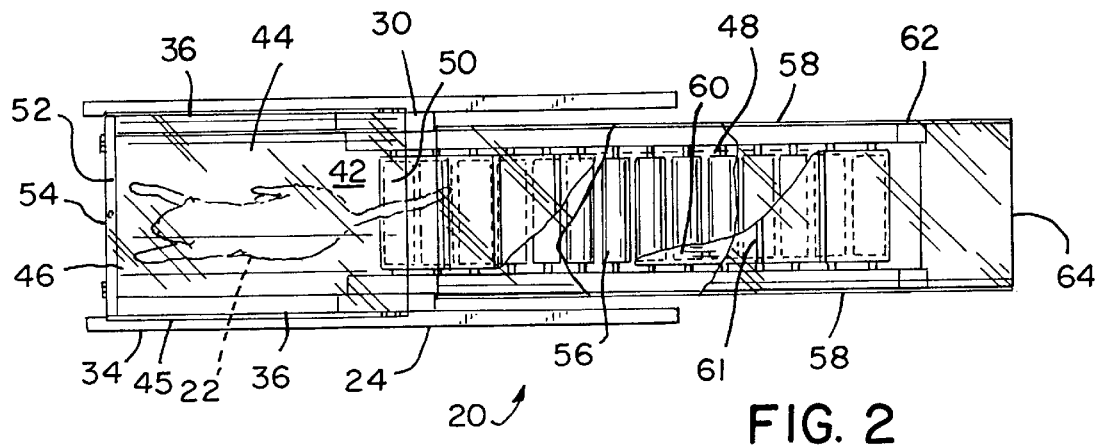
FIG. 2 is a top plan view of the device of FIG. 1, partially broken away to show the rollers of the inclined feline treadmill.
Figure 3:
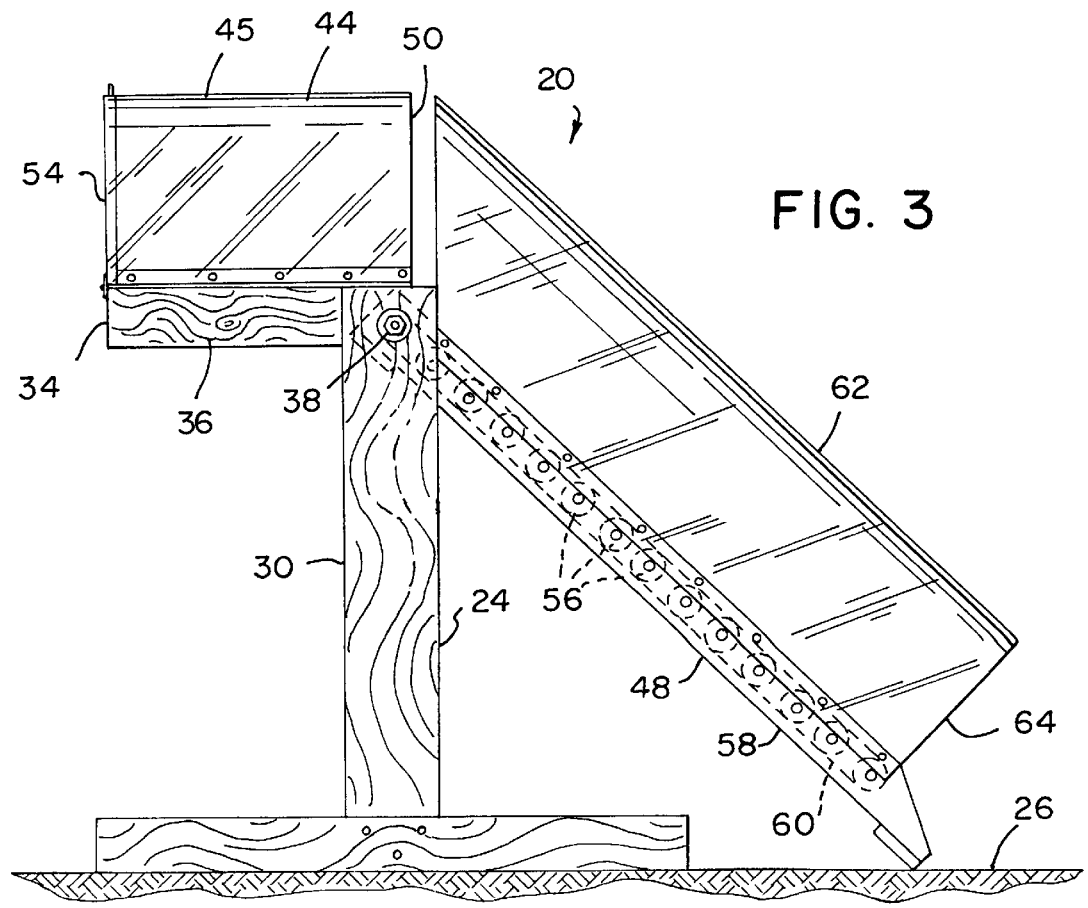
FIG. 3 is a side elevational view of the device of FIG. 2.

Referring more particularly to FIGS. 1–3 wherein like numbers refer to similar parts, the cat exercise and entertainment device 20 of this invention is shown in FIG. 1. The device 20 provides an attractive and convenient activity center for one or more cats 22. The device 20 has a structural frame 24 which stands on a support surface 26 preferably without attachment to the support surface. The frame 24 may be constructed of plastic or metal, but may conveniently be assembled from conventional dimensioned wood products, such as pine 1×4 and 1×6 boards. The frame has two horizontal three-foot long 1×4 support members 28 which are positioned parallel to one another in engagement with the support surface on either side of two upright three-foot long 1×6 members 30. The upright members 30 are connected together and the horizontal members are spaced apart by a 1×4 cross member 32.

A cat perch 34 is supported in cantilever relation to the frame 24. The cat perch has two side members 36 which are connected to the upright members 30 with removable bolts 38. A floor board 42 extends between the two side members 36 and provides a resting place for the cat 22. The floor board 42 may be covered with a section of carpet, fabric, or other insulated material to provide for cat comfort while on the perch 34. A cover 44 is defined over the floor board 42 by a flexible sheet of plastic 45 which is fastened to extend between the two side members 36 in a continuous curve. The cover 44 defines a cat compartment 46 with the floor board 42 of the perch 34.

A treadmill 48 is connected to the upright members 30 of the frame 24 and extends between the support surface 26 and the perch 34. The perch cover 44 defines an inlet opening 50 adjacent the inclined treadmill 48, and an outlet opening 52 on the side of the floor board 42 spaced from the treadmill. The outlet opening 52 is alternately covered and revealed by a pivotable door 54 fastened to the perch side members 36. The door 54 may be closed when it is desired to retain the cat 22 within the device 20 for short periods of time, for example when non-cat-appreciative guests are in the house. A similar door may be provided at the inlet to the treadmill or at the inlet opening 50 of the perch. The door may be locked in a closed position with a pin extending through the perch cover, or may be held in place with any number of conventional fasteners, such as those found on common mailboxes.

The treadmill 48, as shown in FIG. 2, has a plurality of parallel spaced cylindrical wooden rollers 56 mounted to inclined ramp members 58. A continuous closed looped belt 60 extends around all the rollers 56, and moves about the rollers as the cat 22 advances up the treadmill 48. The movement of the belt 60 on the rollers 56 provides exercise value to the cat 22, in that the cat must traverse a greater inclined distance when ascending the treadmill 48 than the actual inclined length of the ramp members 58. As cats are adept at minimizing exertion, the treadmill 48 should be covered with a plastic cover 62 to prevent the cat from simply jumping from the support surface to the perch inlet opening 50. The belt 60 may be formed of any conventional belting material, for example vinyl, and is preferably supplied with parallel ½ by ½ inch spaced wooden bars 61 to aid in cat traction and serve as steps. The belt may be for example, 8 inches wide, and 72 inches long.

Restricted from high jumping by the cover 62, the cat 22 must make a series of limited height leaps or steps within the cover. Care must be taken that the inclination of the treadmill 48 not be made so steep for a particular cat that it is not possible to gain entrance to the perch. To facilitate the adjustment of the ramp incline, the treadmill 48 side ramp members 58 are preferably connected by bolts to the bolt holes in the frame upright members 30. By loosening the bolts slightly, the treadmill 48 may be pivotally adjusted with respect to the frame, to permit the inlet 64 of the treadmill to be placed on a bookcase, chair, or other elevated item of furniture, and to thereby adjust the inclination of the treadmill or to provide convenient connection between another piece of cat furniture and the perch. Alternatively, the base of the treadmill may be provided with telescoping legs, not shown, which can elevate the base of the treadmill as the inclination of the treadmill is adjusted.

In addition to providing exercise to the cat, the device 20 also provides diversion and entertainment to both the cat and the cat's owner, as the cat travels along the treadmill, and into and out of the perch. To further add to the cat's entertainment, food and water may be made accessible on the perch, and a cat hygiene pan may be positioned between the horizontal members or on the perch.

It should be noted that although wooden rollers with a vinyl belt have been disclosed, other conventional treadmill constructions may be employed, for example, closely spaced polyurethane or other plastic rollers. In addition, although the perch and ramp covers have been disclosed as transparent, they may also be formed of opaque plastic or other material.

It is understood that the invention is not limited to the particular construction and arrangement of parts herein illustrated and described, but embraces such modified forms thereof as come within the scope of the following claims.

I claim:

1. A feline exercise device comprising:
    a frame positionable on a support surface;
    a perch connected to the frame above the support surface;
    an inclined ramp which extends from the support surface to the perch;
    a cover which extends over the perch to define an enclosed cat compartment thereon which extends from an inlet end adjacent the inclined ramp to an end spaced from the ramp; and
    a motorless treadmill which extends from the support surface to the perch, the treadmill having a closed looped belt mounted to the ramp, the belt being movable, such that a cat traversing the ramp from the support surface to the perch will cause the belt to slide with respect to the ramp, to thereby cause the cat to traverse a distance along the belt which is greater than the distance between the support surface and the perch in reaching the perch.

2. The feline exercise device of claim 1 wherein the perch cover defines a feline inlet adjacent the inclined ramp, and an outlet at a location spaced from the inclined ramp, and further comprising a pivotable door connected to the perch adjacent the outlet, the door being pivotable between an open position in which a cat can exit the perch through the outlet, and a closed position, in which the cat's exit from the cat compartment through the outlet is blocked.

3. The feline exercise device of claim 1 further comprising a cover which extends over the inclined ramp, the ramp cover defining a ramp entrance, wherein the cover restricts access to the perch to only those cats entering along the inclined ramp.

4. The feline exercise device of claim 1 wherein the inclined ramp is pivotally connected to the frame adjacent to the perch, such that the inclination of the ramp may be adjusted, with the ramp being capable of being less steep for heavier feline use, and more steep for lighter feline use.

5. The feline exercise device of claim 1 further comprising a plurality of rotatable rollers mounted to the inclined ramp and enclosed within the belt, the belt traveling over the rollers and being supported thereon for sliding motion.

6. The feline exercise device of claim 1 wherein the frame comprises:
    a plurality of spaced apart base members which extend along the support surface; and
    at least one upwardly extending member which connects the perch to the base members adjacent the ramp, the perch being supported in cantilever arrangement from the upwardly extending member.

7. A feline exercise device comprising:
    a frame;
    an inclined motorless treadmill mounted to the frame, the treadmill having an entrance end and an elevated discharge end;
    a perch connected to the frame adjacent the treadmill discharge end, wherein the treadmill has a closed looped belt mounted hereon, the belt being slidable on the treadmill; and
    a cover which extends over the treadmill, the cover having an inlet opening at the entrance to the treadmill and an outlet opening at the discharge end of the treadmill, such that a cat gaining access to the perch passes over the treadmill belt, the cover preventing the cat from jumping from the treadmill entrance end to the treadmill discharge end; and
    a cover which extends over the perch, the cover extending from an inlet end adjacent the discharge end of the treadmill to an end spaced from the treadmill.

8. The feline exercise device of claim 7 wherein the treadmill cover is formed of transparent plastic material.

9. The feline exercise device of claim 8 wherein the perch cover defines a feline perch inlet adjacent the treadmill discharge end, and a perch outlet at a location spaced from the treadmill, and further comprising a pivotable door connected to the perch adjacent the perch outlet, the door being pivotable between an open position in which a cat can exit the perch through the outlet, and a closed position, in which the cat's exit from the cat compartment through the outlet is blocked.

10. The feline exercise device of claim 7 wherein the treadmill is pivotally connected to the frame adjacent to the perch, such that the inclination of the treadmill may be adjusted, with the treadmill being capable of being less steep for heavier feline use, and more steep for lighter feline use.

11. The feline exercise device of claim 7 wherein the treadmill further comprises a plurality of rotatable rollers mounted to inclined members and enclosed within the belt, the belt traveling over the rollers and being supported thereon for sliding motion.

12. The feline exercise device of claim 7 wherein the frame comprises:
   a plurality of spaced apart base members which extend along the support surface; and
   at least one upwardly extending member which connects the perch to the base members adjacent the treadmill, the perch being supported in cantilever arrangement from the upwardly extending member.

13. A feline exercise device comprising:
   a frame having portions which extend horizontally for engagement with a support surface, and portions which extend vertically;
   an inclined motorless treadmill mounted to the vertically extending portions of the frame, the treadmill having an entrance end and an elevated discharge end;
   a perch connected to the frame adjacent the treadmill discharge end, the perch being elevated above the support surface and positioned to receive a cat exiting from the treadmill, wherein the treadmill has a shifting surface thereon such that a cat traversing the treadmill from the entrance end to the discharge end will shift to thereby traverse a distance along the treadmill which is greater than the distance between the entrance end and the discharge end of the treadmill; and
   a perch cover attached to the perch and defining a feline perch inlet adjacent to the treadmill discharge end and a perch end at a location spaced from the treadmill.

14. The feline exercise device of claim 10 further comprising a cover which extends over the perch to define an enclosed cat compartment thereon.

15. The feline exercise device of claim 13 wherein the perch cover defines a perch outlet at a location spaced from the treadmill, and further comprising a pivotable door connected to the perch adjacent the perch outlet, the door being pivotable between an open position in which a cat can exit the perch through the outlet, and a closed position, in which the cat's exit from the cat compartment through the outlet is blocked.

16. The feline exercise device of claim 10 wherein the treadmill is positionably connected to the frame adjacent to the perch, such that the inclination of the treadmill may be adjusted, with the treadmill being capable of being less steep for heavier feline use, and more steep for lighter feline use.

17. The feline exercise device of claim 10 wherein the treadmill further comprises a plurality of rotatable rollers mounted to inclined members and enclosed within a belt, the belt traveling over the rollers and being supported thereon for sliding motion.

18. The feline exercise device of claim 7 wherein the frame comprises:
   a plurality of spaced apart base members which extend along the support surface; and
   at least one upwardly extending member which connects the perch to the base members adjacent the treadmill, the perch being supported in cantilever arrangement from the upwardly extending member.

19. The feline exercise device of claim 13, further comprising a cover which extends over the treadmill, the cover having an inlet opening at the entrance to the treadmill and an outlet opening at the discharge end of the treadmill, such that a cat gaining access to the perch passes over the treadmill, the cover preventing the cat from jumping from the treadmill entrance end to the treadmill discharge end.

* * * * *